US012196404B1

(12) United States Patent
Chen et al.

(10) Patent No.: US 12,196,404 B1
(45) Date of Patent: Jan. 14, 2025

(54) MIRROR LIGHT

(71) Applicant: Xiamen Guangpu Electronics Co., Ltd., Xiamen (CN)

(72) Inventors: Shifu Chen, Xiamen (CN); Haiding Su, Xiamen (CN); Guobiao Lin, Xiamen (CN)

(73) Assignee: Xiamen Guangpu Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/747,704

(22) Filed: Jun. 19, 2024

(30) Foreign Application Priority Data

Feb. 1, 2024 (CN) ........................ 202420253582.3

(51) Int. Cl.
*F21V 33/00* (2006.01)
*A47G 1/00* (2006.01)

(52) U.S. Cl.
CPC ............. *F21V 33/004* (2013.01); *A47G 1/00* (2013.01)

(58) Field of Classification Search
CPC ........ F21V 33/004; A45D 44/005; A47G 1/00
See application file for complete search history.

(56) References Cited

U.S. PATENT DOCUMENTS 3,368,068 A * 2/1968 Cronheim ............... F21V 33/00 D26/56
2015/0159856 A1 * 6/2015 Adachi ............... F21V 33/0056 362/135
2022/0218091 A1 * 7/2022 Liao ....................... H05B 45/20

* cited by examiner

*Primary Examiner* — Thomas M Sember
(74) *Attorney, Agent, or Firm* — Westbridge IP LLC

(57) ABSTRACT

Disclosed is a mirror light, including a first light body with a built-in spatial lighting module; and a second light body with a built-in local lighting module. In use, the first light body performs spatial lighting, and the second light body performs local lighting, thereby meeting different lighting needs of users.

10 Claims, 5 Drawing Sheets

MIRROR LIGHT

CROSS-REFERENCE TO RELATED APPLICATIONS

The present application claims priority to Chinese Patent Application No. 202420253582.3, filed on Feb. 1, 2024, the entire contents of which are incorporated herein by reference.

TECHNICAL FIELD

The present application relates to a lighting device, in particular to a mirror light.

BACKGROUND

The statements herein merely provide background information related to the present application and may not necessarily constitute prior art.

At present, the mirror lights used for washing and making up have simple functions and relatively poor lighting quality, and there are no mirror lights specially developed for professional applications of making up and washing.

Therefore, how to make the mirror lights have multiple lighting modes so that they can be applied to lighting occasions that pay special attention to the skin, such as washing and making up, and can largely meet the user's special requirements for the lighting environment during the washing and makeup process is a problem that needs to be solved urgently.

SUMMARY

The present application provides a mirror light, comprising a first light body with a built-in spatial lighting module; and a second light body with a built-in local lighting module. The application can be used in conjunction with various makeup mirrors or other mirrors to meet the different lighting needs of users when washing and making up.

DETAILED DESCRIPTION OF THE EMBODIMENTS

Figure 1:
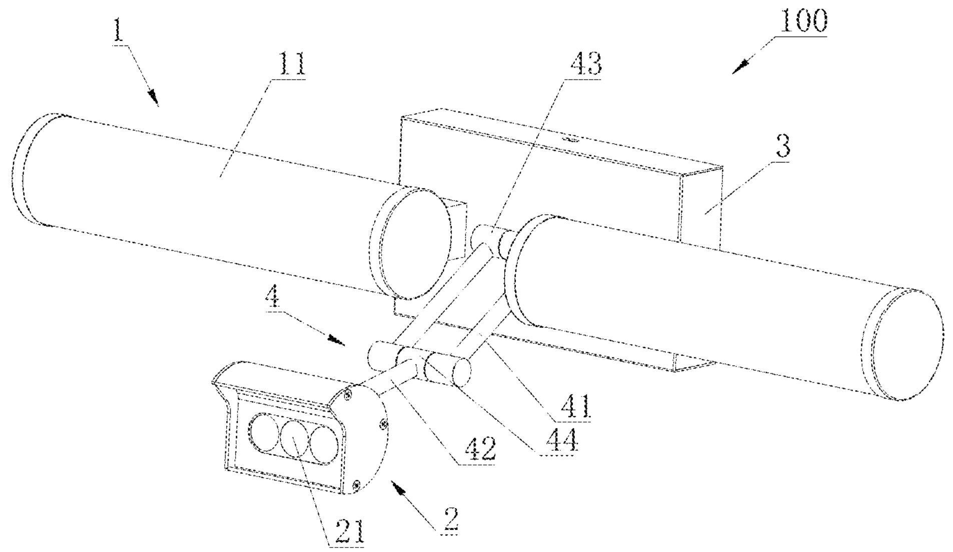
FIG. 1 is a schematic diagram of a mirror light according to an embodiment of the present application.

The present application is described in further detail below with reference to the accompanying drawings and embodiments. It should be understood that the specific embodiments described herein are only used to explain the present application, rather than to limit the present application. It should also be noted that, for the convenience of description, the drawings only show the parts related to the present application rather than all structures.

It should be mentioned that before discussing the exemplary embodiments in greater detail, some of the exemplary embodiments are described as processes or methods described as flowcharts. Although the flowchart describes the steps as a sequential process, many of the steps may be performed in parallel, concurrently, or simultaneously. Furthermore, the order of the steps may be rearranged. A process may be terminated when its operations are completed, but may also have additional steps being not comprised in the drawings. A process may correspond to a method, a function, a procedure, a subroutine, a subcomputer program etc.

In addition, the terms "first", "second" etc. can be used herein to describe various directions, actions, steps, or elements etc. But these directions, actions, steps, or elements should not be limited by these terms. These terms are only used to distinguish a first direction, action, step or element from another direction, action, step or element. For example, without departing from the scope of the present application, the first information may be referred to as the second information, and similarly, the second information may be referred to as the first information. The first information and the second information are both information, but they are not the same information. The terms "first", "second", etc. should not be understood as indicating or implying relative importance or implicitly indicating the quantity of the indicated technical features. Therefore, features defined as "first" or "second" may explicitly or implicitly comprise one or more of such features. In the description of the present application, "plurality" means at least two, for example, two, three, etc., unless otherwise clearly and specifically defined.

FIG. 1 shows a mirror light 100 according to an embodiment of the present application, which comprises a first light body 1 and a second light body 2. The first light body 1 has a built-in spatial lighting module 11; the second light body 2 has a built-in local lighting module 21. In some embodiments, an opening is provided on a surface of the second light body 2, and a light-emitting surface of the local lighting module faces the opening. By arranging the first light body 1 and the second light body 2, different lighting functions can be achieved. For example, the first light body 1 performs spatial lighting, and the second light body 2 performs local lighting, thereby overcoming the disadvantage that the existing mirror light can only perform spatial lighting, making it convenient for users to make up in front of the mirror light.

In some embodiments, the second light body 2 is movable relative to the first light body 1, so that the user can adjust the relative position of the second light body 2, thereby adjusting the area corresponding to the local lighting, which is more convenient and easy to use.

As shown in FIG. 1, the mirror light 100 further comprises a control box 3, which is configured to control the turning on and off of the spatial lighting module 11 in the first light body 1 and the local lighting module 21 in the second light body 2. In an alternative embodiment, a switch is provided on the control box 3, which can control the lighting of the spatial lighting module 11, or the lighting of the local lighting module 21, or the lighting of the spatial lighting module 11 and the local lighting module 21 at the same time.

The first light body 1 and the second light body 2 are respectively arranged on the control box 3. In some embodiments, the first light body 1 is fixedly arranged on the control box 3, and the second light body 2 is movably arranged on the control box 3. In other embodiments, the first light body 1 can also be movably arranged on the control box 3.

Figure 2:
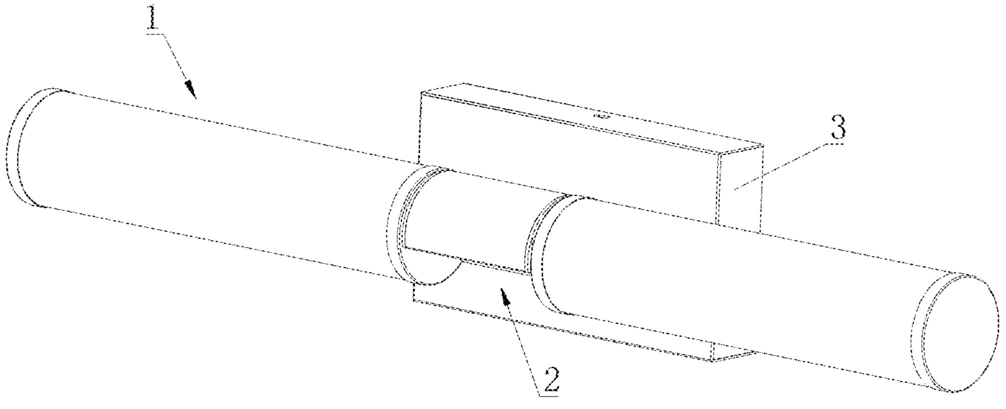
FIG. 2 is a schematic diagram of a mirror light according to a possible embodiment, in which a second light body is arranged on a control box via a rotating shaft.

As shown in FIG. 2, in an embodiment, the second light body 2 is rotatably arranged on the control box 3 via a rotating shaft (not shown in the figure).

Figure 3:
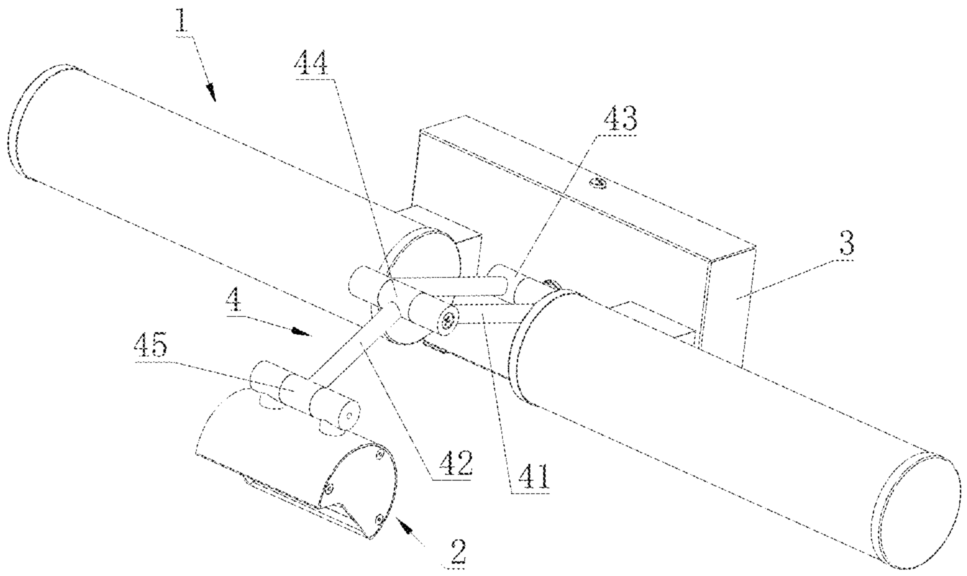
FIG. 3 shows a schematic diagram of a mirror light according to a possible embodiment, in which a second light body is arranged on a control box via a supporting arm.
Figure 4:
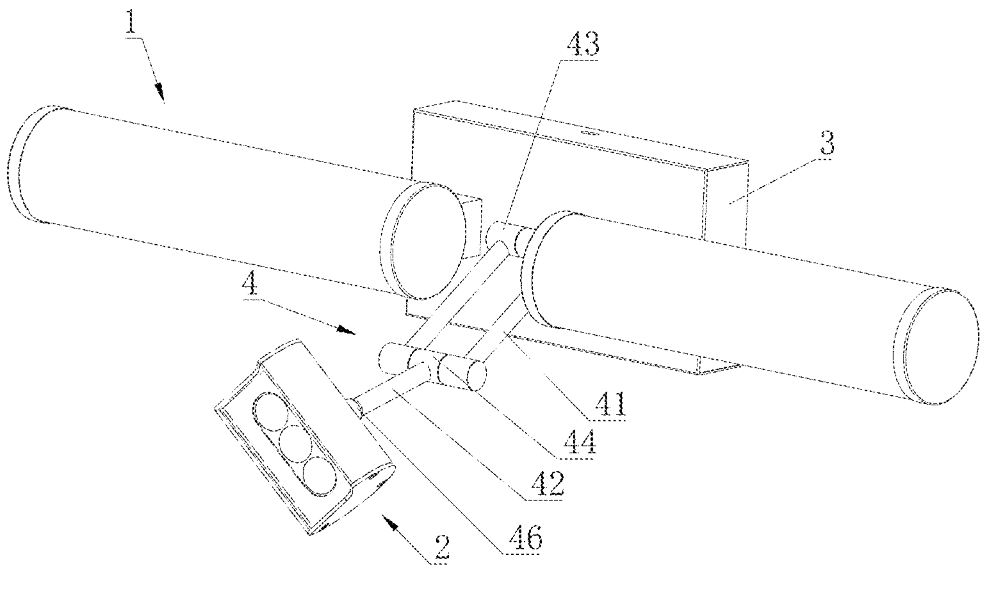
FIG. 4 shows a schematic diagram of a mirror light according to a possible embodiment, in which a second light body is arranged on a control box via a supporting arm.

As shown in FIG. 1 and FIGS. 3-4, in some other embodiments, the second light body 2 is movably arranged on the control box 3 via the supporting arm 4. In some alternative embodiments, the supporting arm 4 comprises a first sub supporting arm 41 and a second sub supporting arm 42, one end of the first sub supporting arm 41 is rotatably arranged on the control box 3 via a first rotating shaft 43, one end of the second sub supporting arm 42 is rotatably connected to the other end of the first sub supporting arm 41 via a second rotating shaft 44, and the second light body 2 is arranged at the other end of the second sub supporting arm 42.

In some embodiments, the second light body 2 is fixedly arranged at the other end of the second sub supporting arm 42, and the second light body 2 can move relative to the first light body 1 under the rotation of the first rotating shaft and the second rotating shaft. In an embodiment, the first sub supporting arm 41 can rotate at most 190° relative to the surface of the control box 3 through the first rotating shaft 43; and the second sub supporting arm 42 can rotate at most 330° relative to the first sub supporting arm 41 through the second rotating shaft 44.

As shown in FIG. 3, in some other embodiments, the second light body 2 is rotatably arranged at the other end of the second sub supporting arm 42 through a third rotating shaft 45, and the second light body 2 can move relative to the first light body 1 under the rotation of the first rotating shaft 43, the second rotating shaft 44 and the third rotating shaft 45. In an embodiment, the second light body 2 can rotate at most 270° relative to the second sub supporting arm 42 through the third rotating shaft 45. The angle can be adjusted through the three rotating shafts to meet different lighting angles and illumination requirements.

As shown in FIG. 4, in some other embodiments, the second light body 2 is movably arranged at the other end of the second sub supporting arm 42 through a universal joint 46, and the second light body 2 can move relative to the first light body 1 under the rotation of the first rotating shaft 43, the second rotating shaft 44 and the universal joint 46. In one embodiment, through the universal joint 46, the second light body 2 can rotate at most 330° relative to the second sub supporting arm 42 in a direction close to or away from the second sub supporting arm 42, and can also rotate 360° around the axis of the second sub supporting arm 42. The angle can be adjusted to any angle through two rotating shafts and one universal joint.

Figure 5:
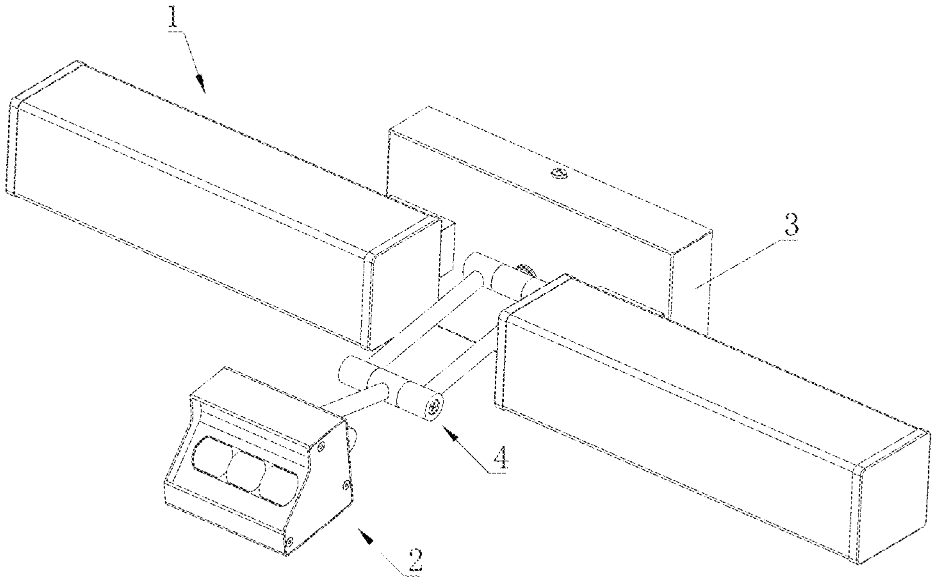
FIG. 5 is a schematic diagram of a mirror light according to a possible embodiment, in which a first light body and a second light body of the mirror light are in the shape of cuboid.

As shown in FIGS. 1-4, in some embodiments, the first light body 1 and the second light body 2 are in the shape of a cylinder. As shown in FIG. 5, in some other embodiments, the first light body 1 and the second light body 2 are in the shape of a cuboid. In other embodiments, the shapes of the first light body 1 and the second light body 2 may be inconsistent, for example, the first light body 1 is in the shape of a cuboid and the second light body 2 is in the shape of a cylinder, or the first light body 1 is in the shape of a cylinder and the second light body 2 is in the shape of a cuboid.

Figure 6:
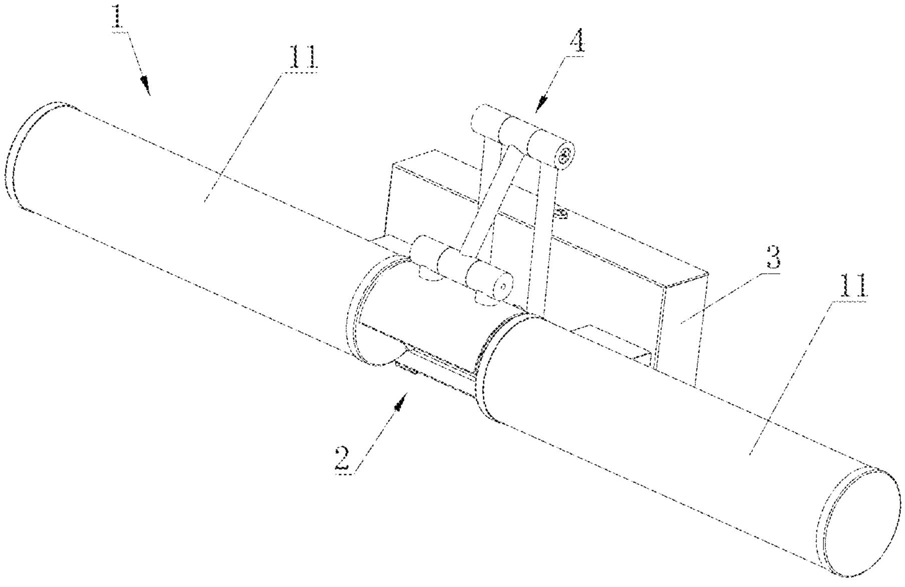
FIG. 6 shows a schematic diagram of a mirror light according to a possible embodiment, in which a first light body comprises two spatial lighting modules and a second light body is in a storage state.
Figure 7:
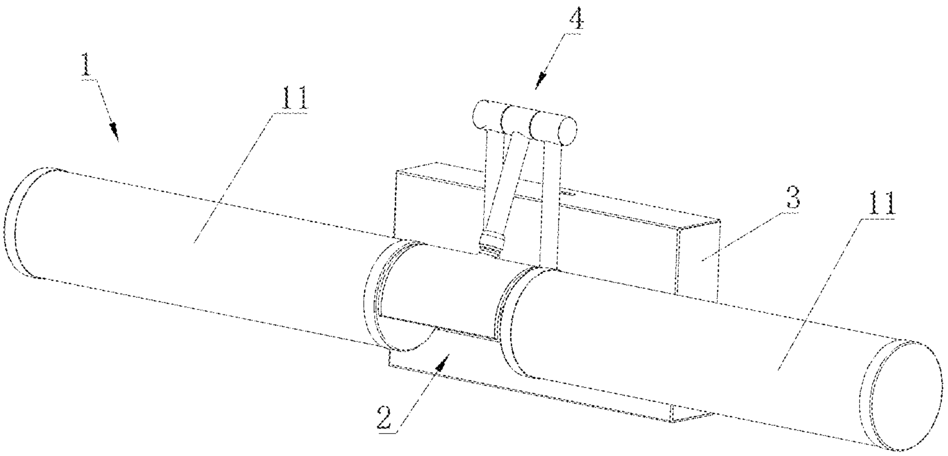
FIG. 7 shows a schematic diagram of a mirror light according to a possible embodiment, in which a first light body comprises two spatial lighting modules and a second light body is in a storage state.
Figure 8:
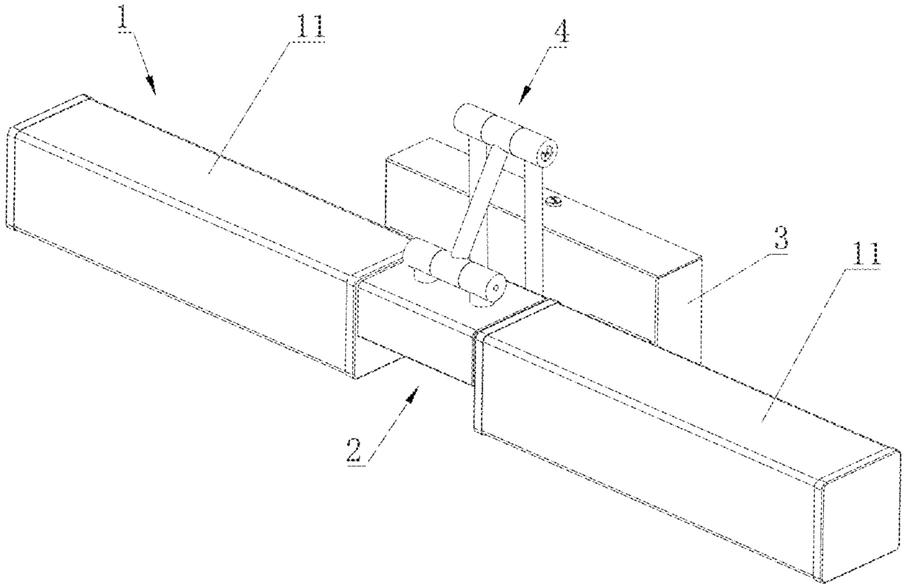
FIG. 8 shows a schematic diagram of a mirror light according to a possible embodiment, in which a first light body comprises two spatial lighting modules and a second light body is in a storage state.

FIGS. 6-8 respectively show the mirror light when the second light body is in the storage state in the embodiments shown in FIGS. 3-5. As shown in FIGS. 6-8, in some embodiments, the first light body 1 comprises two spatial lighting modules 11, and the two spatial lighting modules 11 are arranged at intervals along a length direction so that a space for accommodating the second light body 2 is formed between the two spatial lighting modules 11. When the second light body 2 is not in use, it can be stored in the space between the two spatial lighting modules 11, so that the overall appearance consistency of the mirror light is better.

Figure 9:
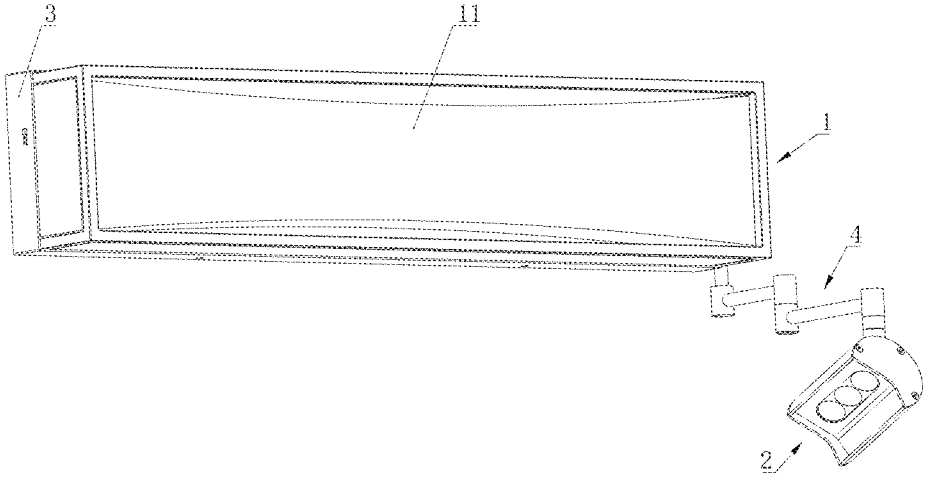
FIG. 9 shows a schematic diagram of a mirror light according to a possible embodiment, in which a first light body comprises one spatial lighting module.

As shown in FIG. 9, in some other embodiments, the first light body 1 comprises only one spatial lighting module 11, and the second light body 2 is movably arranged on the control box 3 via the supporting arm 4. The arrangement of the second light body in this embodiment can be applied to any style of mirror light, thereby achieving the purpose of light filling adjustment.

The above descriptions are merely embodiments of the present application and are not intended to limit the application scope of the present application. Any equivalent changes made using the contents of the specification and drawings of the present application, or directly or indirectly applied in related technical fields, also fall within the application protection scope of the present application.

What is claimed is:

1. A mirror light, comprising:

a first light body comprising two built-in spatial lighting modules; and a second light body with a built-in local lighting module;

wherein the two built-in spatial lighting modules are arranged at an interval, and a space for accommodating the second light body is formed between the two built-in spatial lighting modules.

2. The mirror light according to claim 1, wherein the second light body and the first light body are relatively movable.

3. The mirror light according to claim 2, further comprising:

a control box, configured to control turning on and off of the two built-in spatial lighting modules in the first light body and the local lighting module in the second light body;

the first light body being arranged on the control box, and the second light body being movably arranged on the control box.

4. The mirror light according to claim 3, wherein the second light body is rotatably arranged on the control box via a rotating shaft.

5. The mirror light according to claim 3, wherein the second light body is movably arranged on the control box via a supporting arm.

6. The mirror light according to claim 5, wherein the supporting arm comprises:

a first sub supporting arm, one end of the first sub supporting arm being rotatably arranged on the control box via a first rotating shaft; and a second sub supporting arm, one end of the second sub supporting arm being rotatably connected to the other end of the first sub supporting arm via a second rotating shaft, and the second light body being arranged at the other end of the second sub supporting arm.

7. The mirror light according to claim 6, wherein the second light body is rotatably arranged at the other end of the second sub supporting arm via a third rotating shaft.

8. The mirror light according to claim 6, wherein the second light body is movably arranged at the other end of the second sub supporting arm via a universal joint.

9. The mirror light according to claim 1, wherein an opening is provided on a surface of the second light body, and a light-emitting surface of the local lighting module faces the opening.

10. The mirror light according to claim 1, wherein the first light body is in the shape of a cylinder or a cuboid, and the second light body is in the shape of a cylinder or a cuboid.

* * * * *